US012802684B2

(12) United States Patent
Saifee et al.

(10) Patent No.: US 12,802,684 B2
(45) Date of Patent: Nov. 17, 2026

(54) RELEVANCE BASED SOURCE SELECTION FOR FAR-FIELD VOICE SYSTEMS

(71) Applicant: Avago Technologies International Sales Pte. Limited, Singapore (SG)

(72) Inventors: Qutubuddin Saifee, Bengaluru (IN); Raghuram Annadana, Bangalore (IN); Sunil Kashinath Shripad, Bangalore (IN); Manoj Singhal, Bengaluru (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 452 days.

(21) Appl. No.: 18/077,180

(22) Filed: Dec. 7, 2022

(65) Prior Publication Data

US 2024/0194189 A1 Jun. 13, 2024

(51) Int. Cl.
*G10L 15/08* (2006.01)
*G10L 15/02* (2006.01)
*G10L 21/02* (2013.01)

(52) U.S. Cl.
CPC .............. *G10L 15/08* (2013.01); *G10L 15/02* (2013.01); *G10L 21/02* (2013.01)

(58) Field of Classification Search
CPC ......... G10L 15/08; G10L 15/02; G10L 21/02; G10L 15/005; G10L 25/51; G10L 2015/228; G10L 2021/02082; G10L 2025/783; G10L 25/78; G10L 15/22; G10L 2021/02166; H04R 3/00
See application file for complete search history.

(56) References Cited

U.S. PATENT DOCUMENTS 8,346,545 B2 1/2013 Jung et al.
9,208,780 B2 12/2015 Fujimoto et al.
9,311,928 B1 4/2016 Avargel et al.
(Continued)

FOREIGN PATENT DOCUMENTS

WO WO 2012/158156 A1 11/2012
WO WO-2019029352 A1 * 2/2019 ........... G10L 15/063

OTHER PUBLICATIONS

Partial European Search Report, Application No. 23214560.7, Mar. 20, 2024.

*Primary Examiner* — Pierre Louis Desir
(74) *Attorney, Agent, or Firm* — King Intellectual Asset Management

(57) ABSTRACT

An electronic device includes a far-field voice (FFV) processor including a source selection module. The source selection module receives a set of audio signals and determines, for each audio stream, whether the audio stream is relevant to an application. The source selection module receives several separate probability computations, with each probability computation providing a probability of the presence of a particular characteristic. Additionally, the source selection module receives one or more applications as well relevance information (e.g., one or relevant characteristics) associated with the one or applications. The source selection module can used respective probabilities to determine if one or more characteristics are present in an audio signal, and compare the characteristic(s) to the relevance information for the application. Using this information, the source selection module can determine, for each audio signal, to which respective application the audio stream is relevant.

20 Claims, 5 Drawing Sheets

(56) References Cited

U.S. PATENT DOCUMENTS

| | | | |
|---|---|---|---|
| 9,330,684 | B1 | 5/2016 | Kirsch |
| 9,460,722 | B2 * | 10/2016 | Sidi .................... H04M 3/5175 |
| 9,761,245 | B2 | 9/2017 | Lamy |
| 11,380,322 | B2 * | 7/2022 | Lang ...................... G06F 3/165 |
| 11,984,123 | B2 * | 5/2024 | Maury .................... G06F 3/167 |
| 2013/0151254 | A1 * | 6/2013 | Seshadri ................ G10L 15/28<br>704/256.1 |
| 2014/0244245 | A1 | 8/2014 | Briot |
| 2015/0088514 | A1 * | 3/2015 | Typrin ................. H04M 3/493<br>704/231 |
| 2016/0240210 | A1 | 8/2016 | Lou |
| 2016/0379661 | A1 | 12/2016 | Kar et al. |
| 2019/0355384 | A1 * | 11/2019 | Sereshki ............... H04R 1/406 |
| 2020/0312315 | A1 | 10/2020 | Li et al. |
| 2021/0076130 | A1 * | 3/2021 | Laitinen ................ H04R 1/406 |
| 2022/0148592 | A1 | 5/2022 | Maury et al. |

* cited by examiner

RELEVANCE BASED SOURCE SELECTION FOR FAR-FIELD VOICE SYSTEMS

TECHNICAL FIELD

The present description relates generally to data communications hardware including, for example, audio source selection in far-field voice (FFV) systems for applications such as automatic speech recognition (ASR) and voice and/or video calling based on source content relevance.

BACKGROUND

FFV recognition systems are designed to recognize voice in a noisy environment based on speaker localization using a microphone array. In some instances, an FFV system is designed to detect a wake word, or trigger word, and determine a command from speech following the wake word. However, due to the nature of the FFV system, a user is often relatively far from the FFV system, thus reducing the amplitude at which the FFV system receives the user's voice command. Additionally, other noises (e.g., background noise, music, television) are picked up by the microphone array. These noises often create challenges in determining which audio signal is relevant (i.e., the speech or the noise) and whether the audio signal should be further processed/used.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

Figure 1:
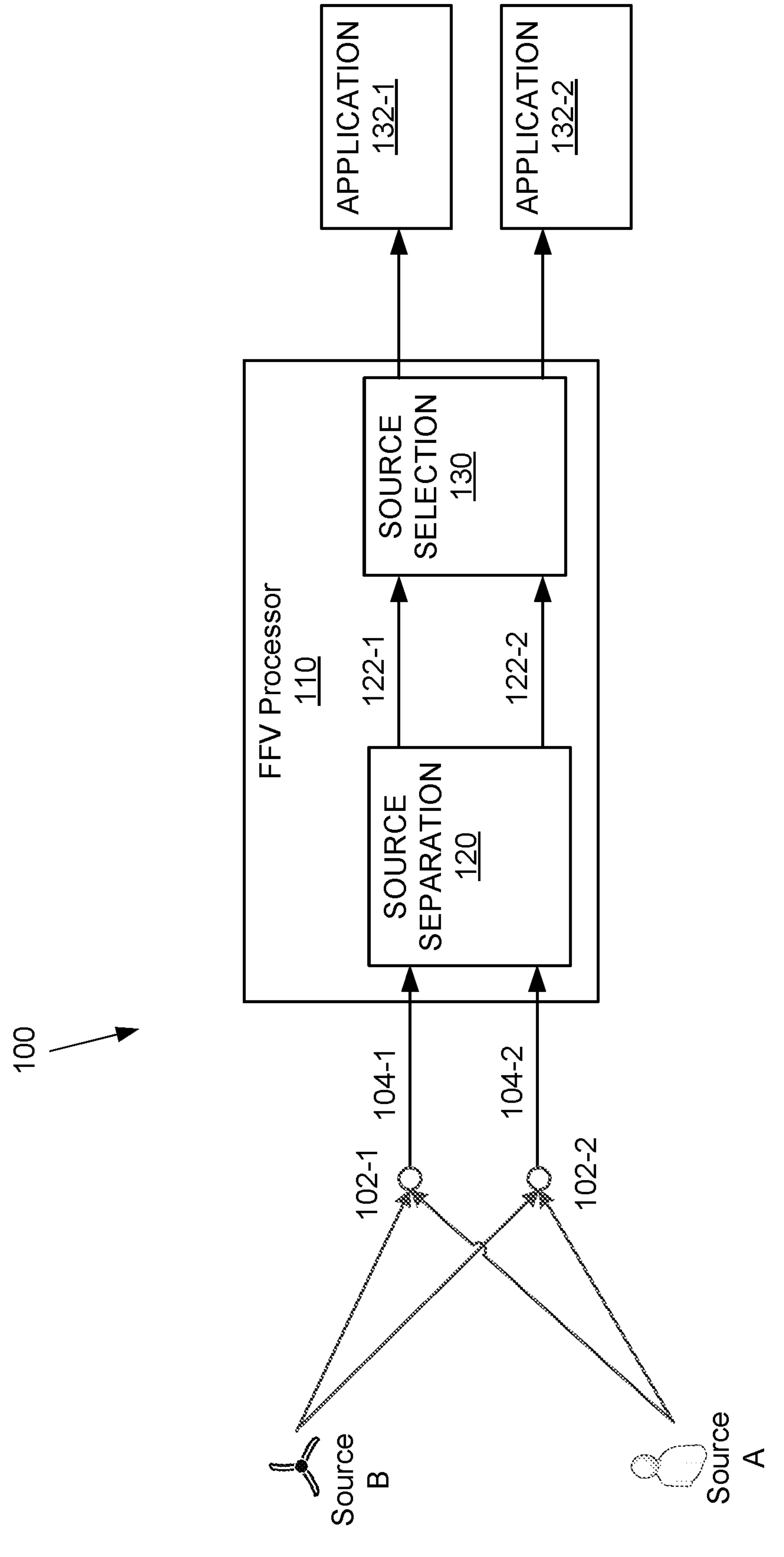
FIG. 1 illustrates a block diagram illustrating an example of a system for automatic speech recognition and voice and/or video calling, according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

According to some aspects, the subject technology is directed to electronic devices with source separation systems that receive and separate multiple audio signals into audio streams, and source selection systems that determine, based upon relevant characteristics or information associated with one or more applications, whether each audio stream is relevant for a particular application. An "audio stream" may refer to a processed (e.g., by a source separation system) audio signal. Exemplary applications include ASR and voice and/or video calling (VVC). In some instances, the applications are associated with end user applications. Exemplary electronic devices include appliances such as a set top box (STB), also known as a cable box, and a home assistant (e.g., smart home assistant). ASR includes recognizing and determining user speech, which may include commands or questions/queries for the device, as well as responses to questions/queries from the device. VVC includes two-way calls between users or conference calls among multiple parties, using either voice only or voice and video.

Devices described herein often involve long distances between the user and the device, such as several feet between the user and the device in a room. Accordingly, devices described herein are characterized as FFV systems. Due to the nature of the distance between the user and the device, enabling ASR and VVC in real-world scenarios, with the user being far from the device, involves handling scenarios where voice commands are spoken in environments ranging from a relatively silent environment to a noisy environment. Regarding the latter, the noise may be due to background sounds, for example, music being played or other people talking. The background sounds can interfere with the desired speech and degrade the performance of ASR and VVC application.

FFV systems described herein are designed to improve ASR and VVC performance in such real-world scenarios by reducing the impact of interfering sounds and enhancing voice or the intended source audio. An FFV process can be broken into two stages, namely, source separation and source selection. For example, source separation stage takes N audio inputs or audio signals (from various audio sources) captured by N microphones of a microphone array and separates the audio inputs into M (e.g., less than or equal to N) different output audio streams. It should be noted that N and M are each positive integers. Each audio stream is expected to contain audio from a different source with higher clarity. Then, the source selection stage uses the M separated source streams as inputs and maps the source streams as an output for an application (e.g., ASR or VVC), based on relevancy of the audio stream with respect to the application. The sequence of source separation and source selection stages is decided based on the FFV process. Alternatively, an FFV system may use processes that perform source separation and source selection using an integrated process thereby performing joint source separation and source selection.

FIG. 1 illustrates a block diagram illustrating an example of a system 100. As non-limiting examples, the system 100 may include an STB, an electronic device, or a home assistant. In this regard, the system 100 is designed to understand spoken language, distinguish intended use(s) of language, such as commands and queries, respond by using a spoken language (e.g., English), playing music or other sounds, or performing other functions such as turning a device on or off, and/or enable voice and video communication. Different intended uses of language may include general conversational language that does not involves commands and/or queries.

The system 100 includes a microphone 102-1 and a microphone 102-2. The microphones 102-1 and 102-2 are representative of an array of N microphones of the system 100. The system 100 further includes an FFV processor 110. The FFV processor 110 may include a source separation module 120 and a source selection module 130. The source separation module 120 and the source selection module 130, as well as other modules described herein, may include one or more algorithms stored on memory and executable by controller circuitry (e.g., microcontrollers, MEMS controllers, digital signal processors, application-specific integrated circuits, central processing unit). Other components or processors not shown for simplicity.

The microphones 102-1 and 102-2 can capture audio from a number (e.g., M less than or equal to N) of sources. As shown, microphones 102-1 and 102-2 capture audio from a Source A (e.g., a person) and a source B (e.g., a device such as a fan or another person). Based on the sources (e.g., Source A and Source B), the microphone 102-1 and the microphone 102-2 generate an audio signal 104-1 and an audio signal 104-2, respectively. Each of the audio signals 104-1 and 104-2 includes components from both Source A and Source B. The source separation module 120 receives and separates the audio signals 104-1 and 104-2 into an audio stream 122-1 and an audio stream 122-2. Through a de-mixing, weighting, and/or beamforming process provided by the source separation module 120, the audio streams 122-1 and 122-2 may contain audio signals from each source but with higher clarity from one of the sources (e.g., Source A or Source B). For example, the audio stream 122-1 may correspond to Source A while the audio stream 122-2 may correspond to Source B.

The source selection module 130 receives the audio streams 122-1 and 122-2 from the source separation module 120 as inputs and maps each of the audio streams 122-1 and 122-2 as output to an application. As shown, the audio stream 122-1 is mapped to an application 132-1 and the audio stream 122-2 is mapped to an application 132-2. Each application includes various characteristics. In this regard, the source selection module 130 determines whether an audio stream would be used with the application, based on several relevance factors discussed below. For example, the source selection module 130 may determine the audio stream 122-1 is more relevant to an ASR application, and may also determine the audio stream 122-2 more relevant to a VVC application. Accordingly, audio signals (e.g., audio signals 104-1 and 104-2) can be categorized as to whether each of the audio signals is relevant to a particular application.

While the above example shows two audio sources captured by two microphones, in other embodiments, the FFV processor 110 takes N audio inputs captured by N microphones in a microphone array and separates audio from different sources into M (e.g., less than or equal to N) different output audio streams. Accordingly, the number of microphones and sources can vary.

Figure 2:
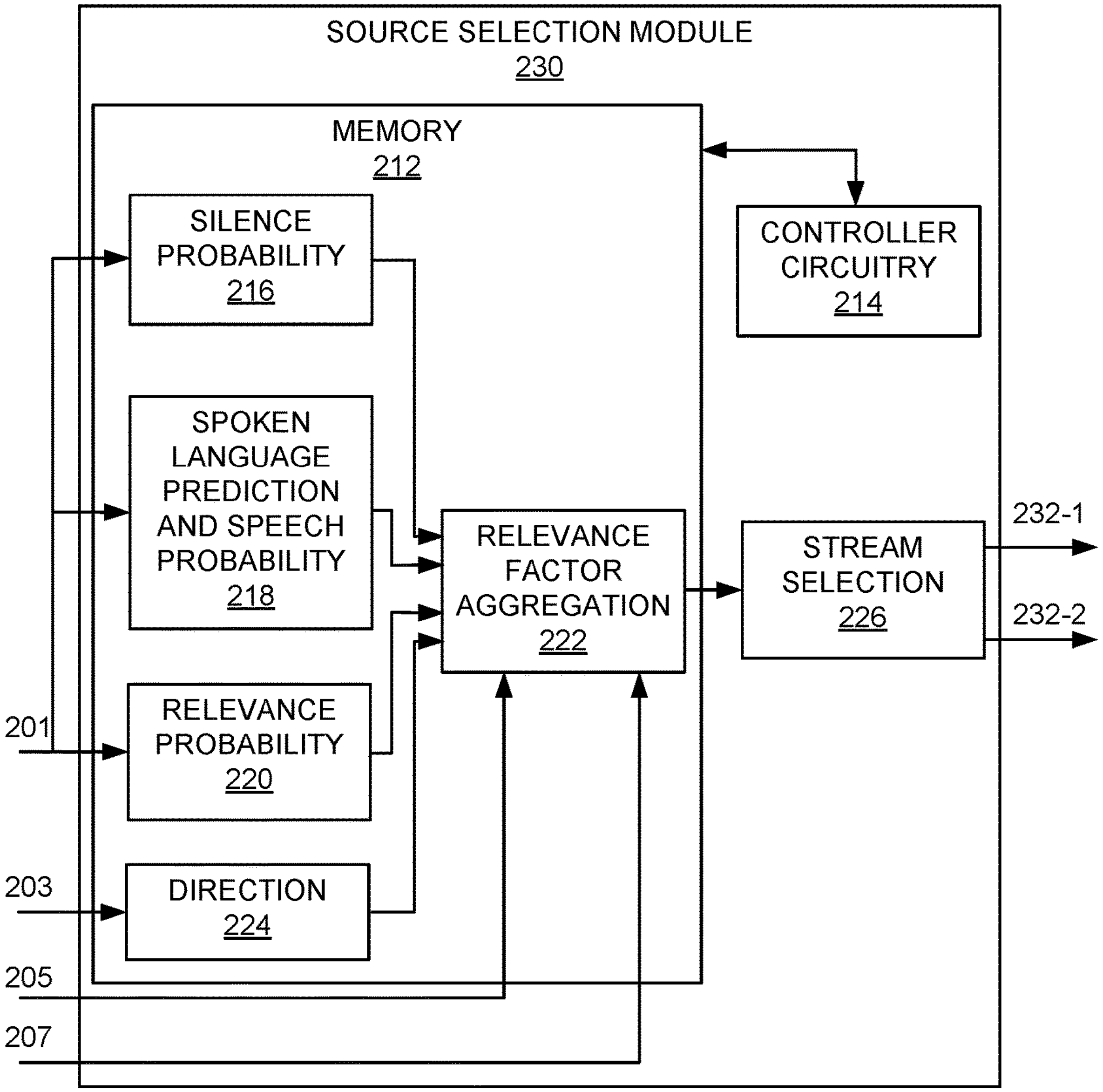
FIG. 2 illustrates a schematic diagram illustrating an example implementation of a source selection module, according to aspects of the subject technology.

FIG. 2 illustrates a schematic diagram illustrating an example implementation of a source selection module 230. The source selection module 230 may be included in an integrated circuit used in a system (e.g., system 100 of FIG. 1). As shown, the source selection module 230 includes a memory 212 (e.g., read-only memory and/or random-access memory) that stores executable instructions. The executable instructions may include steps used to evaluate the probability of one or more characteristics in an audio stream as well as determine the relevance of one or more audio streams with respect to an application, as described herein. Also, while the memory 212 is shown as being integrated with the source selection module, the memory 212 may be stored externally with respect to the source selection module 230.

The source selection module 230 may further include controller circuitry 214. The controller circuitry 214 may include a MEMS controller, an application-specific integrated circuit, and/or one or more microcontrollers, as non-limiting examples. The controller circuitry 214 is operatively coupled to the memory 212, and as a result, can receive and carry out instructions, or steps, stored on the various blocks of memory 212 described below.

The source selection module 230 can receive and analyze audio streams 201. The audio streams 201 may be received as separated audio streams (e.g., audio streams 122-1 and 122-2) separated by a source separation module.

As discussed herein, the source selection module 230 includes several probability modules (e.g., algorithms, computational blocks) stored on the memory 212 and designed to determine the probability of a characteristic present in an audio stream. When the determined probability of the characteristic present in the audio stream is at or above a threshold probability (e.g., a probability selected within a range of 0.5 to 0.9, or similarly 50% to 90%), a determination is made that the characteristic is present in the audio stream.

The source selection module 230 includes a silence probability computation module 216. The silence probability computation module 216 can receive each of the audio streams 201 and distinguish between low background noise (including silence) and the presence of sound (not silent). The silence probability computation module 216 is designed to determine a probability of silence (or lack of noise) associated relatively low or no background noise. Thus, the silence probability computation module 216 can determine the probability of a characteristic (e.g., silence or low background noise) present in an audio stream.

A probability of silence may be relevant to certain applications. For example, in ASR applications, some form of speech is expected, and accordingly, when an audio stream is determined to be either silent or low background noise, then the silence probability computation module 216 determines the audio stream is not relevant to ASR.

The source selection module 230 includes a spoken language prediction and speech probability computation module 218. The spoken language prediction and speech probability computation module 218 can receive each of the audio streams 201 and distinguish between the presence of spoken language and general noise, music, unrecognizable speech. Additionally, the spoken language prediction and speech probability computation module 218 can distinguish between one dialect (e.g., English, Spanish, French, etc.) from other dialects. Thus, the spoken language prediction and speech probability computation module 218 can determine the probability of a characteristic (e.g., spoken language probability) present in an audio stream, and separately, can determine the probability of an additional characteristic (e.g., dialect probability) present in an audio stream.

A determination of noise versus spoken language may be relevant to certain applications. For example, in ASR applications, some form of speech is expected, and accordingly, when an audio stream is determined to include noise, then the spoken language prediction and speech probability computation module 218 determines the audio stream is not relevant to ASR. Conversely, when an audio stream is determined to include speech (i.e., spoken language), then the spoken language prediction and speech probability computation module 218 to determine that the audio stream is relevant to ASR. In another example, for an ASR application expecting speech in the form of a predetermined dialect, such as English language, a command or query based on speech other than in the English language causes the spoken language prediction and speech probability computation module 218 determines the audio stream is not relevant to ASR, while a command or query in English language is relevant to ASR.

The source selection module 230 includes a relevance probability computation module 220. The relevance probability computation module 220 can receive each of the audio streams 201 and distinguish between language suitable for (i.e., commonly used with) an application and other general language. Thus, the relevance probability computation module 220 can determine the probability of a characteristic present in an audio stream. For ASR applications, the relevance probability computation module 220 can determine the probability of words or phrases associated with a wake word(s), commands, queries, questions, or responses to questions. For VVC applications, the relevance probability computation module 220 can determine the probability of general words spoken in conversation, which may include words or phrases (e.g., "Hi" or "Nice to hear your voice").

A determination of words suitable for a particular application may be relevant to certain applications. For example, when an audio stream includes language associated with commands or queries, the relevance probability computation module 220 can determine the audio stream is relevant for ASR applications. Conversely, when an audio stream includes language associated with general language or language usually used in human conversations, the relevance probability computation module 220 can determine the audio stream is not relevant for ASR applications but is relevant for relevant for VCC applications. Accordingly, the relevance probability computation module 220 can determine whether there is intent for speech directed to a particular application. Additionally, the relevance probability computation module 220 may include machine learning capabilities, allowing the relevance probability computation module 220 to learn over time what is appropriate for each application, and perform relevancy determinations without explicit instruction.

The source selection module 230 includes a relevance factor aggregation module 222. The relevance factor aggregation module 222 receives information (e.g., probability information) from each of the silence probability computation module 216, the spoken language prediction and speech probability computation module 218, and the relevance probability computation module 220. Based on the received information, the relevance factor aggregation module 222 can determine a weighted sum of probabilities or an average probability (from the three received probabilities) and determine whether each of the audio streams 201 is relevant for a particular application once the relevant factors for one or more application(s) is/are received. This will be discussed further below.

The relevance factor aggregation module 222 can receive additional information to improve the accuracy of determine the appropriate application. For example, the relevance factor aggregation module 222 can receive a direction 224 of the source of the audio signal separated into an audio stream. The direction input is a direction indicator generated based on separation weights 203, which are also referred to as de-mixing weights and are obtained from a multisource processor in the source separation module 120 of FIG. 1. Using a microphone array (e.g., microphones 102-1 and 102-2 of FIG. 1), the relevance factor aggregation module 222 can determine an angle of the source of the audio signal relative to the microphone array. Moreover, the information provided by the direction 224 can provide an indication to relevance factor aggregation module 222 whether the sources (e.g., Source A and Source B of FIG. 1) are moving relative to the microphone array. As an example, if two sources switch places in a room, the information provided by the direction 224 can provide an indication to the relevance factor aggregation module 222 that the sources have switched places. As a result, if the relevance factor aggregation module 222 previously determined two sources, at respective angles, were relevant to respective applications, the relevance factor aggregation module 222 can swap and reassign the resultant audio streams (from the two sources) to the applications.

Additionally, the relevance factor aggregation module 222 can receive echo strength 205 associated with soundwaves (e.g., acoustical energy) generated by a speaker(s) of a system (that includes the source selection module 230) and subsequently received by a microphone array of the system. For example, when the system takes the form of a home assistant that can play audio files (e.g., music), the audio output of an audio file can be received by the microphone array. The relevance factor aggregation module 222 can determine whether the audio stream is caused by feedback from the speaker(s) of the system or not, and in case it is feedback, the relevance factor aggregation module 222 will give the feedback a low (e.g., zero or close to zero) weight. Put another way, the relevance factor aggregation module 222 can effectively cancel or ignore the contribution of audio related to the feedback.

Also, the relevance factor aggregation module 222 can receive an application identification 207. For each application, the application identification 207 can provide the relevance factor aggregation module 222 with relevance information (e.g., instructions) as to how relevant, or how much weight to give to, a characteristic (when the probability-based models determine the characteristic is present). For example, the application identification 207 can indicate to the relevance factor aggregation module 222 that, for an ASR application, speech associated with any of wake words, commands (e.g., "turn the volume up" or "turn the channel to channel 192"), and queries (e.g., "What is the weather supposed to be like today?") is of relatively high relevance and noise or speech associated with general words (e.g., basic conversation) are of relatively low relevance. Thus, the characteristics associated with ASR are weighed more heavily, and audio streams with these characteristics present, as determined by the probabilities, may be determined to be associated with ASR. Also, the application identification 207 can indicate to the relevance factor aggregation module 222 that, for a VVC application, speech associated with general words or language associated with human conversations are of relatively high relevance, and speech associated with commands and queries are of relatively low relevance. Thus, the characteristics associated VVC are weighed more heavily, and audio streams with these characteristics present, as determined by the probabilities, may be determined to be associated with VVC.

Accordingly, the relevance factor aggregation module 222 receives, from the probability computations, respective probabilities of the presence of a characteristic (e.g., silence, spoken language, relevance) in each audio stream of the audio streams 201, and also receives information from the application identification 207 as to what is relevant for each application. The relevance factor aggregation module 222 compares the received relevance information, based on the application identification 207, against the characteristics in the audio streams (provided the probability of the presence of the characteristic(s) indicates the characteristics are present). Accordingly, the relevance factor aggregation module 222 relies on several factors to make a decision, as opposed to using a single factor. This may be particularly beneficial in FFV applications when audio signals related to intended language is competing with noise and other sounds in a room. Also, as a result of determining whether each of the audio streams 201 are relevant to a particular application, it can be determined whether an audio source associated with an audio stream(s) is relevant to a particular application.

The source selection module 230 includes a stream selection module 226. For each audio stream of the audio streams 201, the relevance factor aggregation module 222 indicates to the stream selection module 226 the audio stream to which application is relevant. The stream selection module 226 can map an audio stream to an application. As shown, the stream selection module 226 maps an audio stream to an application 232-1 and another audio stream to an application 232-2, which may be a different application than the application 232-1. Accordingly, the audio streams are provided by the source selection module 230 to the appropriate application.

In some implementations, the ASR and/or VVC applications may be cloud-based or can be implemented within a system that includes the source selection module 230.

Figure 3:
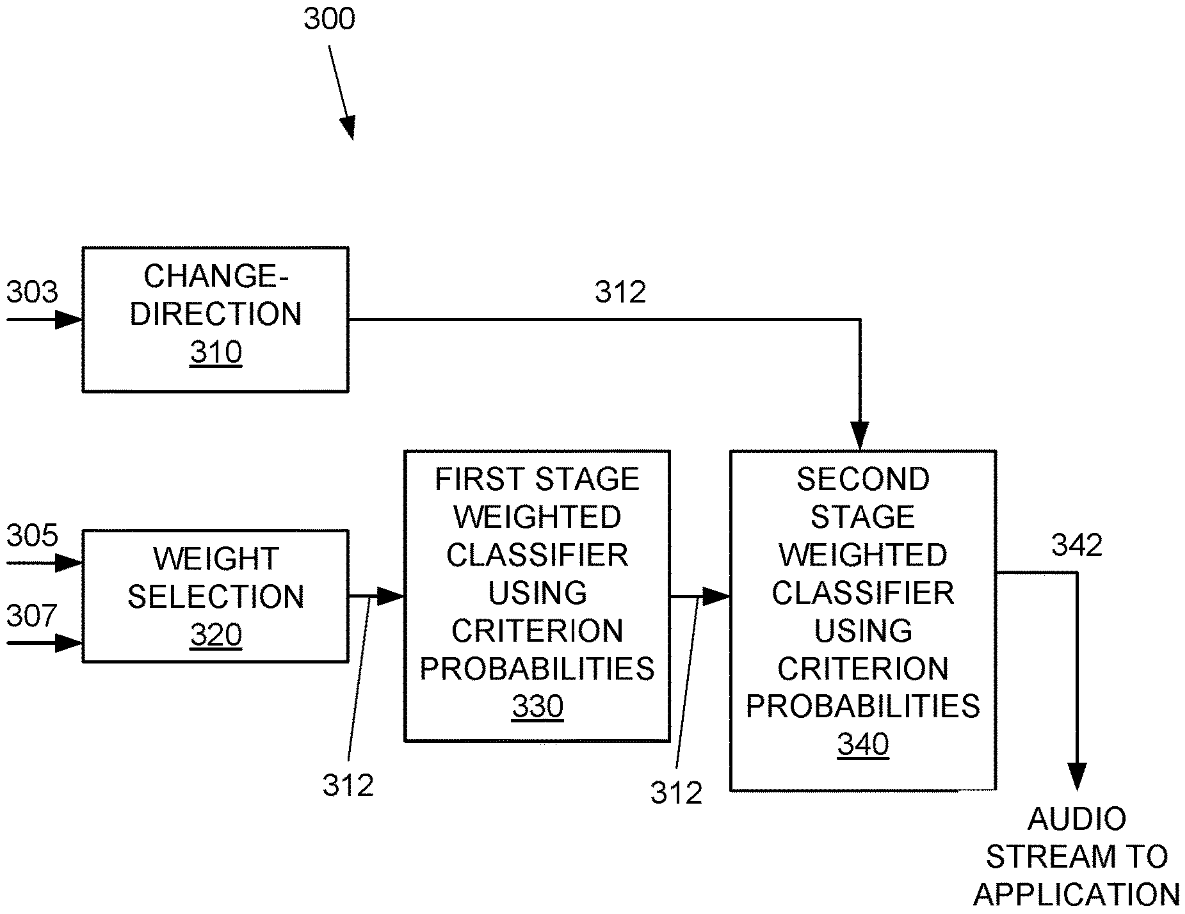
FIG. 3 illustrates a flow diagram illustrating an example of an implementation 300 of relevance factor aggregation, according to aspects of the subject technology.

FIG. 3 illustrates a flow diagram illustrating an example of an implementation 300 of relevance factor aggregation, according to aspects of the subject technology. The implementation 300 may occur on control circuitry (e.g., one or more processors) of a source selection system described herein. According to the implementation 300, the relevance factor aggregation process includes a change-direction detection processor 310, a weight selection processor 320, a first stage weighted classifier 330 and a second stage weighted classifier 340. The change-direction detection processor 310 detects a change in the direction of the source in the audio streams received from the source separation module (in other words, change in source to-stream mapping) and provides a first indicator 312 based on a direction indicator 303, which is provided by directional information (e.g., direction 224 of FIG. 2). The weight selection processor 320 selects weighting factors, to be applied to the probabilities discussed above with respect to FIG. 2, based on an echo strength signal 305 and application identification 307.

The first stage weighted classifier 330 computes a first stage weighted classification based on selected weights from the weight selection processor 320. The second stage weighted classifier 340 provides an output 342 to an audio-stream selection processor (e.g., stream selection 226 of FIG. 2) for audio stream to application mapping based on the first stage weighted classifier 330, and the first indicator 312 from the change-direction detection processor 310.

Figure 4:
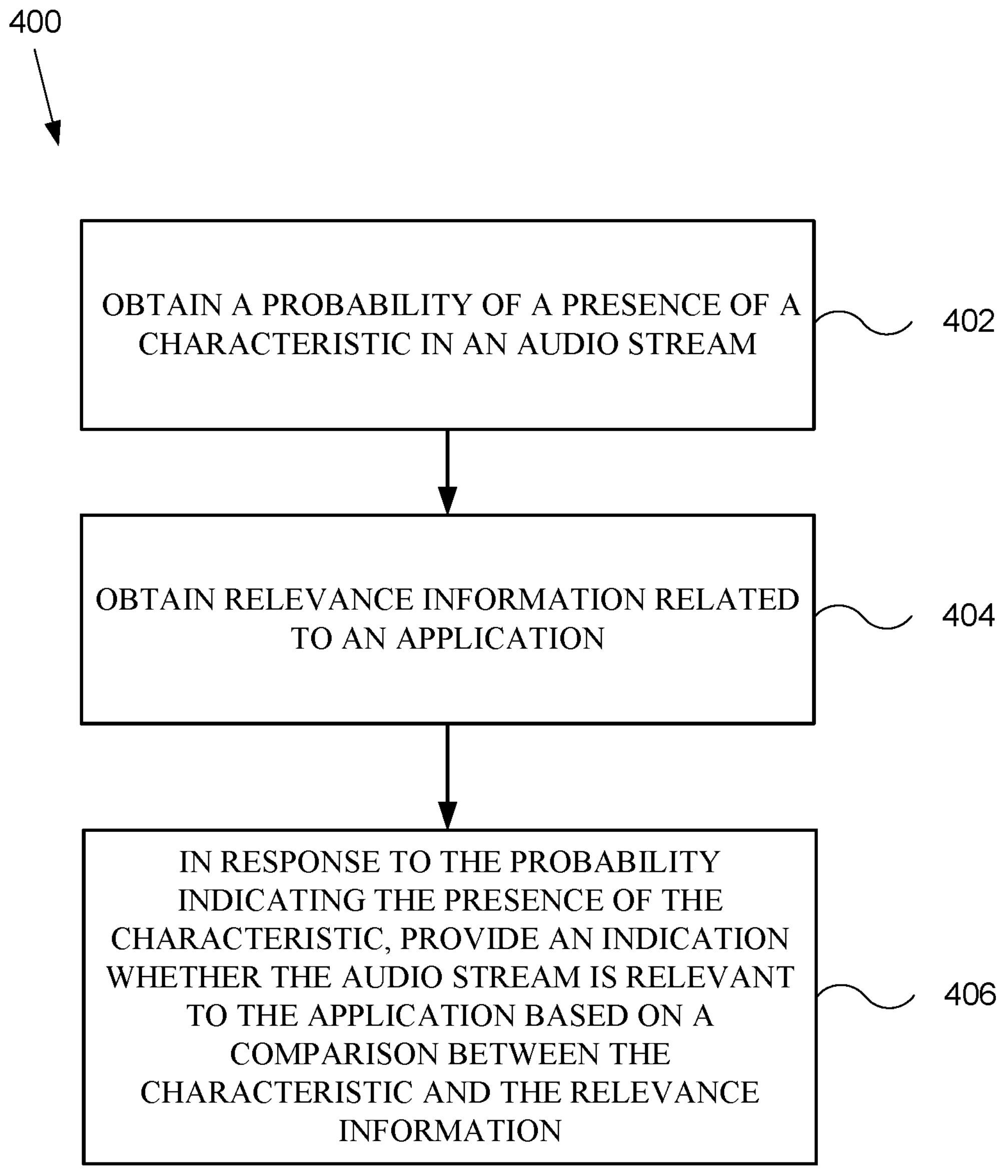
FIG. 4 illustrates a flow diagram illustrating an example of an implementation of relevance factor aggregation, according to aspects of the subject technology.

FIG. 4 illustrates a flow diagram illustrating an example of a method 400. The method 400 may be carried out by a system that includes a source selection module described herein.

In step 402, a probability of a presence of a characteristic in an audio stream is obtained. The audio stream may be obtained by a microphone or microphone array of an electronic device that includes the integrated circuit. A probability computation may be performed by at least one of a silence probability computation module, a spoken language prediction and speech probability computation module, and a relevance probability computation module. In some embodiments, a respective probability is obtained by each of the probability computation modules.

In step 404, obtaining relevance information related to an application. Example applications include ASR and VVC. Example relevance information for ASR applications includes wake word(s), commands, queries, questions, or responses to questions. Example relevance information for VVC applications includes general words spoken in conversation, which may include words or phrases other than a wake word(s), commands, or queries.

In step 406, in response to the probability indicating the characteristic is present, an indication is provided that the audio stream is relevant to the application based on a comparison between the characteristic and the relevance information. The indication may be provided to a stream selection module. For example, a relevance factor aggregation module can notify the stream selection module that the audio stream is relevant for the application. It should be noted that the method 400 can be used for several audio signals separated into several audio streams and several applications can be received. In this regard, the method 400 can determine which audio stream(s) is/are relevant to which application(s).

Figure 5:
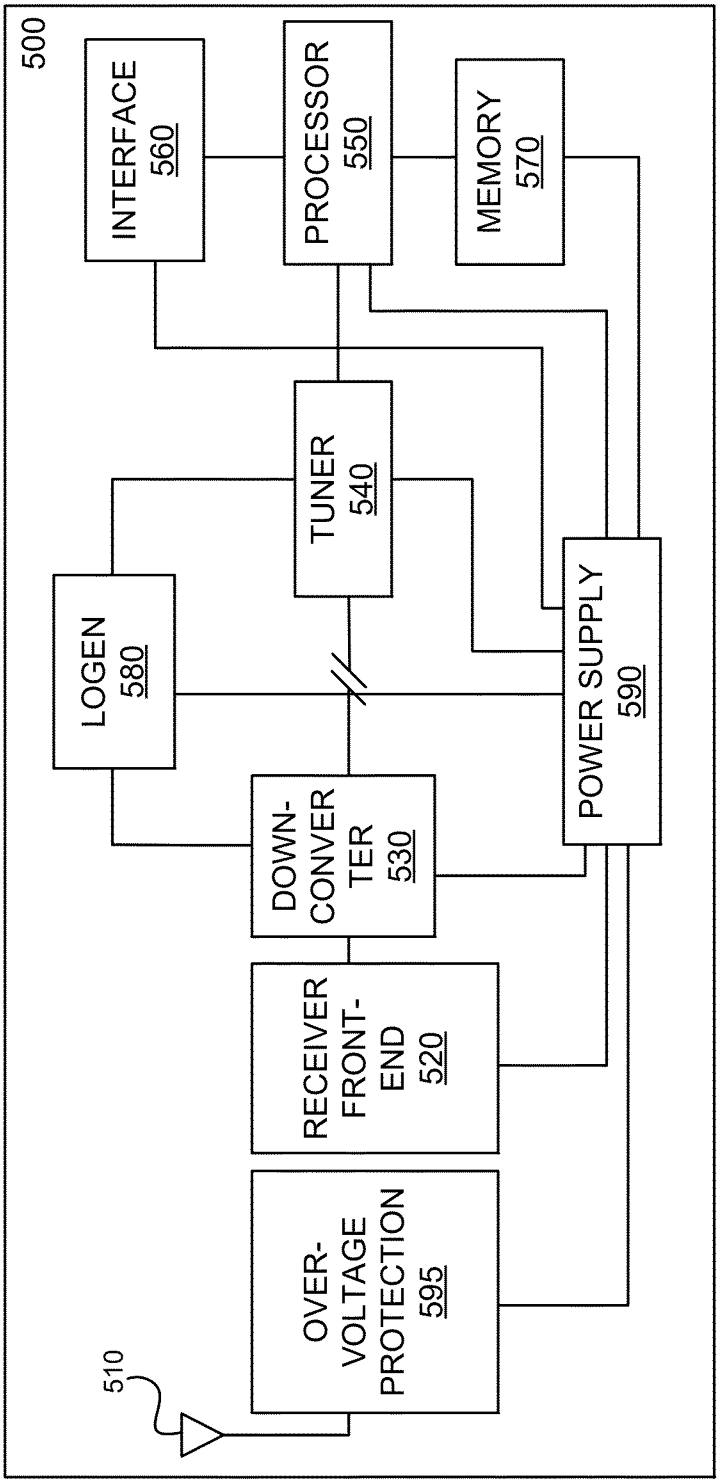
FIG. 5 illustrates a flow diagram illustrating an example of a method for managing audio signals, according to aspects of the subject technology.

FIG. 5 illustrates an example of an electronic device 500, in accordance with one or more implementations of the subject technology. The electronic device 500 may include an electronic device such as a STB (e.g., cable box) or a home assistant. The electronic device 500 may include a feed 510 coupled to a satellite antenna, a receiver front-end 520, a down-converter 530, a tuner 540, a processor 550, an interface 560, a memory 570, a local oscillator generator (LOGEN) 580, a power supply 590, and an overvoltage protection device 595. In various embodiments of the subject technology, the electronic device 500 may include other processors or components not shown here for simplicity. One or more of the blocks represented in FIG. 5 may be integrated on one or more semiconductor substrates. For example, the blocks 520-580 may be realized in a single chip or a single system on a chip, or may be realized in a multi-chip chipset.

The feed 510 may be suitable for receiving broadband signals (e.g., satellite signals) over a wide range of frequencies. Although a single feed 510 is illustrated, the subject technology is not so limited. The downconverter 530 may comprise suitable logic, circuitry, interfaces, and/or code that can use local oscillator (LO) signals generated by the LO generator (LOGEN) 580 to down-convert the satellite signals (e.g., at 12 GHz) to radiofrequency (RF) signals (e.g., at 950-2150 MHz). The tuner 540 may comprise suitable logic, circuitry, interfaces, and/or code that can use proper LO signals generated by the LOGEN 580 to down-convert the RF signals and to generate baseband signals.

The processor 550 may comprise suitable logic, circuitry, and/or code that may enable processing data and/or controlling operations of the electronic device 500. In this regard, the processor 550 may be enabled to provide control signals to various other portions of the electronic device 500. The processor 550 may also control transfers of data between various portions of the electronic device 500. Additionally, the processor 550 may enable implementation of an operating system or otherwise execute code to manage operations of the electronic device 500.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only, and do not limit the subject disclosure.

The predicate words "configured to", "operable to", and "programed to" do not imply any particular tangible or intangible modification of a subject, but, rather, are intended to be used interchangeably. For example, a processor configured to monitor and control an operation or a component, may also mean the processor being programed to monitor and control the operation or the processor being operable to monitor and control the operation. Likewise, a processor configured to execute code can be construed as a processor programed to execute code, or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An integrated circuit for an electronic device, the integrated circuit comprising:

a memory that stores instructions; and controller circuitry coupled to the memory, wherein executing the instructions causes the controller circuitry to:

obtain, from a microphone array, an audio signal, obtain respective probabilities of a presence of a plurality of characteristics in the audio signal, obtain relevance information related to an application, obtain echo strength associated with feedback from an audio file played on a speaker of the electronic device, determine weighting factors to be applied to each of the respective probabilities based at least on the echo strength and the relevance information related to the application, assign respective weights to the plurality of probabilities based on the weighting factors, provide an indication whether the audio signal is relevant to the application based on the assigned respective weights, and cancel the feedback from the audio file played on the speaker of the electronic device based on the assigned respective weights.

2. The integrated circuit of claim 1, wherein executing the instructions causes the controller circuitry to assign a weight to a probability of a presence of at least one a of the plurality of characteristics in the audio signal in response to the probability of the presence of the at least one characteristic being greater than a threshold probability.

3. The integrated circuit of claim 1, wherein:

the plurality of characteristics comprises speech, and a spoken language prediction and speech probability computation module determines the probability of the presence of speech.

4. The integrated circuit of claim 3, wherein:

the application comprises automatic speech recognition, and the speech comprises a command or a query.

5. The integrated circuit of claim 1, wherein:

the plurality of characteristics comprises speech associated with an application, and a relevance probability computation module determines the probability of the presence of speech associated with the application.

6. The integrated circuit of claim 1, wherein:

the plurality of characteristics comprises background noise, and a silence probability computation module determines the probability of the presence of background noise.

7. The integrated circuit of claim 1, wherein:

executing the instructions further causes the controller circuitry to obtain, using the microphone array, a direction of the audio, signal, and the direction comprises an angle with respect to the microphone array.

8. The integrated circuit of claim 1, wherein executing the instructions further causes the controller circuitry to provide the indication to a stream selection module configured to map the audio signal to the application.

9. The integrated circuit of claim 1, wherein:

the application comprises voice and video calling, and the audio signal comprises speech other than a command or query.

10. An electronic device, comprising:

a microphone array comprising at least one microphone configured to receive an audio signal; and a source selection module coupled to the microphone array, the source selection module comprising:

a plurality of probability computation modules, and a relevance factor aggregation module configured to:

obtain from the plurality of probability computation modules respective probabilities of a presence of a plurality of characteristics in the audio signal, obtain relevance information related to an application, obtain echo strength associated with feedback from an audio file played on a speaker of the electronic device, determine weighting factors to be applied to each of the respective probabilities based at least on the echo strength and the relevance information related to the application, assign respective weights to the plurality of probabilities based on the weighting factors, provide an indication whether the audio signal is relevant to the application based on the assigned respective weights, and cancel the feedback from the audio file played on the speaker of the electronic device based on the assigned respective weights.

11. The electronic device of claim 10, wherein the plurality of probability computation modules comprises a silence probability computation module configured to receive the audio signal and determine a probability of silence by distinguishing between background noise and a presence of sound.

12. The electronic device of claim 10, wherein the plurality of probability computation modules comprises a spoken language prediction and speech probability computation module configured to determine i) a spoken language probability and ii) a dialect probability.

13. The electronic device of claim 10, wherein the plurality of probability computation modules comprises a relevance probability computation module configured to determine a probability of language from the audio signal being associated with the application.

14. The electronic device of claim 10, wherein the application comprises automatic speech recognition or voice and/or video calling.

15. A computer-implemented method comprising:

obtaining an audio signal;

obtaining respective probabilities of a presence of a plurality of characteristics in the audio signal;

obtaining relevance information related to an application;

obtaining echo strength associated with feedback from an audio file played on a speaker of an electronic device;

determining weighting factors to be applied to each of the respective probabilities based at least on the echo strength and the relevance information related to the application;

assigning respective weights to the plurality of probabilities based on the weighting factors;

providing an indication whether the audio signal is relevant to the application based on the assigned respective weights; and canceling the feedback from the audio file played on a speaker of the electronic device based on the assigned respective weights.

16. The computer-implemented method of claim 15, wherein the application comprises automatic speech recognition.

17. The computer-implemented method of claim 15, wherein the application comprises voice and video calling.

18. The computer-implemented method of claim 17, wherein:

the audio signal comprises speech other than a command or query.

19. The computer-implemented method of claim 15, wherein:

the plurality of characteristics comprises speech, and the method further comprises determining, by a probability computation module, the probability of the presence of speech.

20. The computer-implemented method of claim 19, wherein the speech comprises a command or a query.

* * * * *